United States Patent
Chow et al.

(10) Patent No.: US 6,839,351 B1
(45) Date of Patent: Jan. 4, 2005

(54) PARALLEL PACKET LOOKUP IN A PACKET-SWITCHED NETWORK

(75) Inventors: Peter Ka-Fai Chow, San Jose, CA (US); Bahadir Erimli, Campbell, CA (US); Somnath Viswanath, San Jose, CA (US); Gopal S. Krishna, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 875 days.

(21) Appl. No.: 09/818,135

(22) Filed: Mar. 28, 2001

(51) Int. Cl.$^7$ ............................................. H04L 12/28
(52) U.S. Cl. ...................................................... 370/392
(58) Field of Search ............................... 370/392, 235; 422/412–413, 219, 355, 338, 400, 469, 398; 379/335; 712/219

(56) References Cited

U.S. PATENT DOCUMENTS

| | | | |
|---|---|---|---|
| 6,112,294 A | * 8/2000 | Merchant et al. ........... 712/219 |
| 6,487,212 B1 | * 11/2002 | Erimli et al. ............... 370/413 |
| 6,574,240 B1 | * 6/2003 | Tzeng ......................... 370/469 |
| 6,728,213 B1 | * 4/2004 | Tzeng et al. ................ 370/235 |
| 6,778,547 B1 | * 8/2004 | Merchant .................... 370/422 |

* cited by examiner

*Primary Examiner*—Chi Pham
*Assistant Examiner*—Prenell Jones
(74) *Attorney, Agent, or Firm*—Harrity & Snyder LLP

(57) ABSTRACT

A multiport network device includes output ports, internal rules checking logic, a port filter, and input ports. The input ports receive data frames and transfer the data frames to the internal rules checking logic and the port filter. The internal rules checking logic determines the appropriate output ports for the frame. At potentially the same time, the port filter determines priority information for the frame. The port filter informs the internal rules checking logic when it has completed determining the priority information by transmitting an end-of-frame signal to the internal rules checking logic. In response, if the internal rules checking logic has completed determining the output ports for the frame, it assembles a frame descriptor corresponding to the frame and transmits the frame descriptor to the appropriate output port(s).

16 Claims, 4 Drawing Sheets

PARALLEL PACKET LOOKUP IN A PACKET-SWITCHED NETWORK

TECHNICAL FIELD

The present invention relates generally to communication systems and methods and, more particularly, to systems and methods for increasing packet switching speed in a packet-switched network.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

In conventional layer 2 or layer 3 switches with multiple output queues, two determinations typically need to be made for every received packet: (1) the port that the packet needs to be transmitted from; and (2) the priority of the packet. Different components in the switch typically make these determinations. The received packet is queued awaiting transmission while the components make their respective determinations.

A problem arises because the component that identifies the output port and the component that determines the priority usually take different amounts of time to make their determinations. This leads to varying amounts of time that the received packet must remain queued prior to transmission. Additionally, if the determination of the packet's priority and the output port of the packet is performed in series, the total delay time must at least be equal to the sum of the delays due to these two determinations. To maintain wire speed, however, it is desirable to minimize the total delay time.

DISCLOSURE OF THE INVENTION

Consistent with the present invention, a network switch minimizes packet delay in a network by implementing packet priority lookup and packet port lookup in parallel. In this manner, the throughput of the network switch is increased.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved, in one implementation, by a multiport network device that comprises a receive port, transmit ports, internal rules checking logic, and a port filter. The receive port receives data frames from the network and the transmit ports transmit the data frames in the network. The internal rules checking logic receives header information of the data frames and, based on the header information, generates a port vector that identifies the transmit ports for a particular one of the data frames. The internal rules checking logic forwards at least the port vector and priority information of the data frame to the transmit ports when it receives an end-of-frame signal corresponding to the data frame. The port filter receives the header information relating to the data frames and, based on the header information, determines the priority information for the data frames. The port filter transmits the determined priority information to the internal rules checking logic and subsequently transmits the end-of-frame signal to the internal rules checking logic.

A second aspect of the present invention is directed to a method for forwarding a data frame in a network device. The method comprises receiving the data frames at receive ports in the network device and transmitting header information of a data frame to internal rules checking logic. The internal rules checking logic determines frame forwarding information for the data frame that identifies appropriate output ports for the data frame. A port filter concurrently determines priority information for a data frame based on the header information. The data frame is then output from the network device based on the determined priority information and the determined frame forwarding information.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
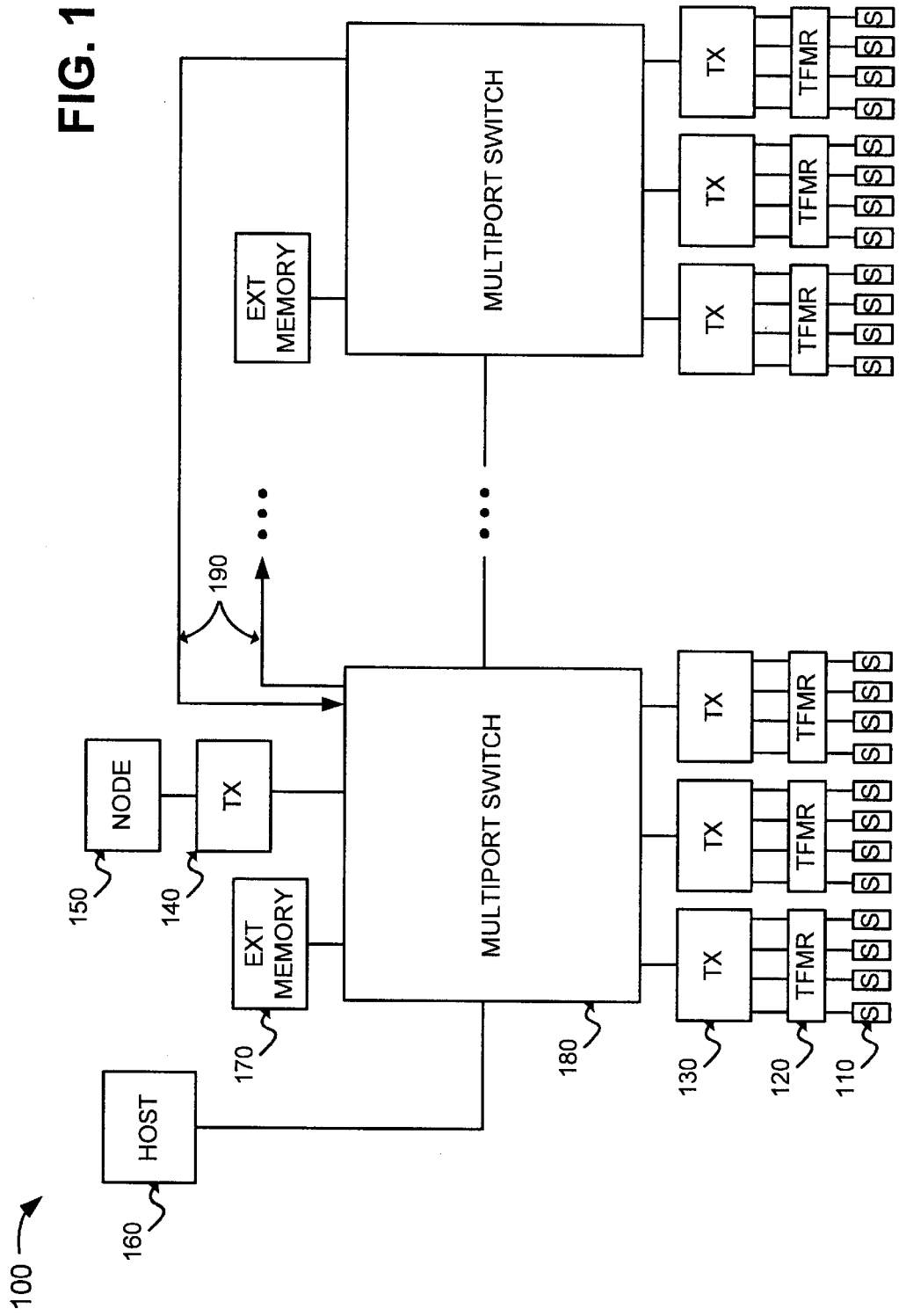
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
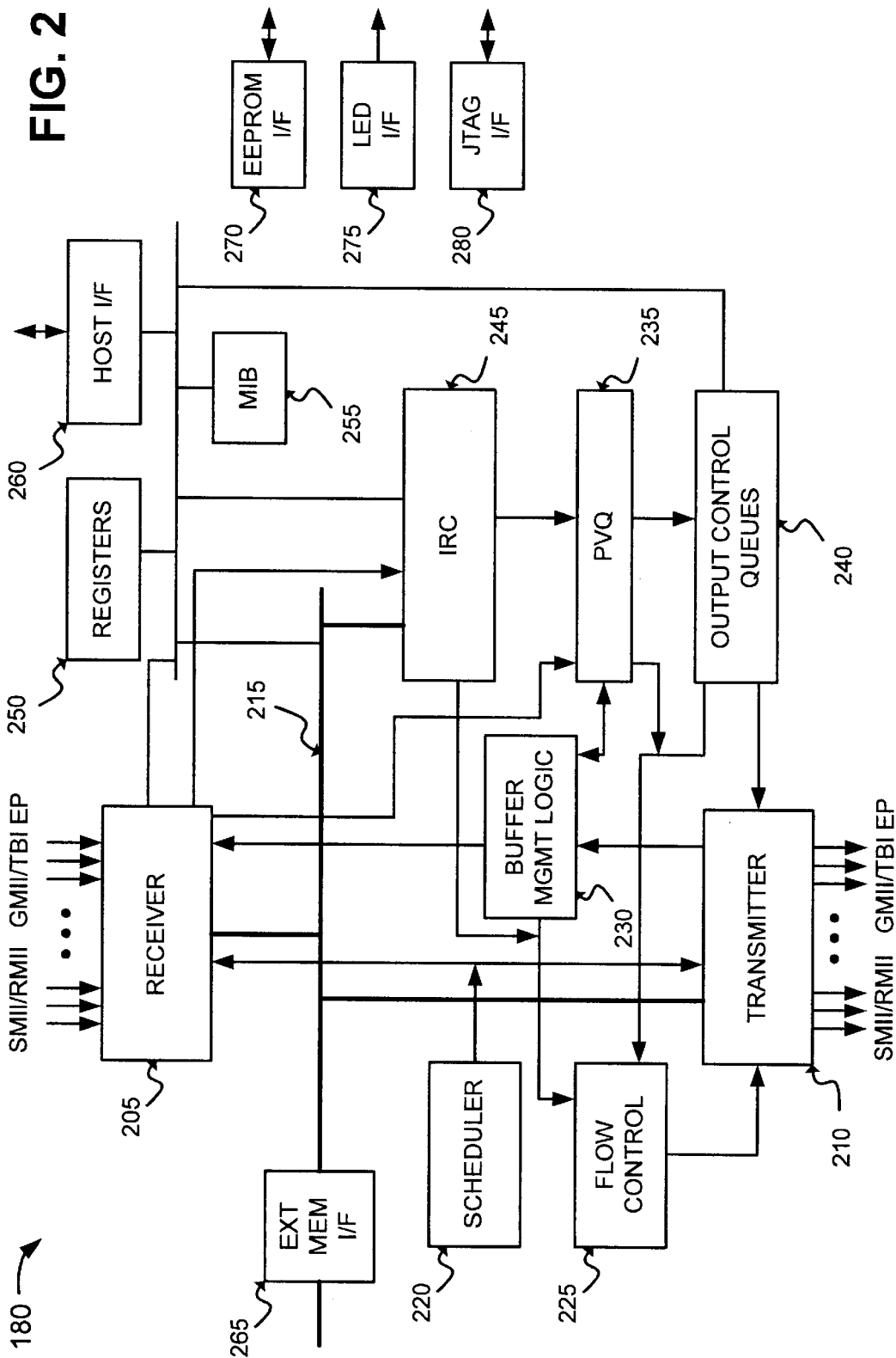
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 monitors (i.e., "snoops") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Processing Logic

The present invention is directed to logic that operates in the receiver 205 and IRC 245 to determine, in parallel, the appropriate output port and priority for received packets.

Figure 3:
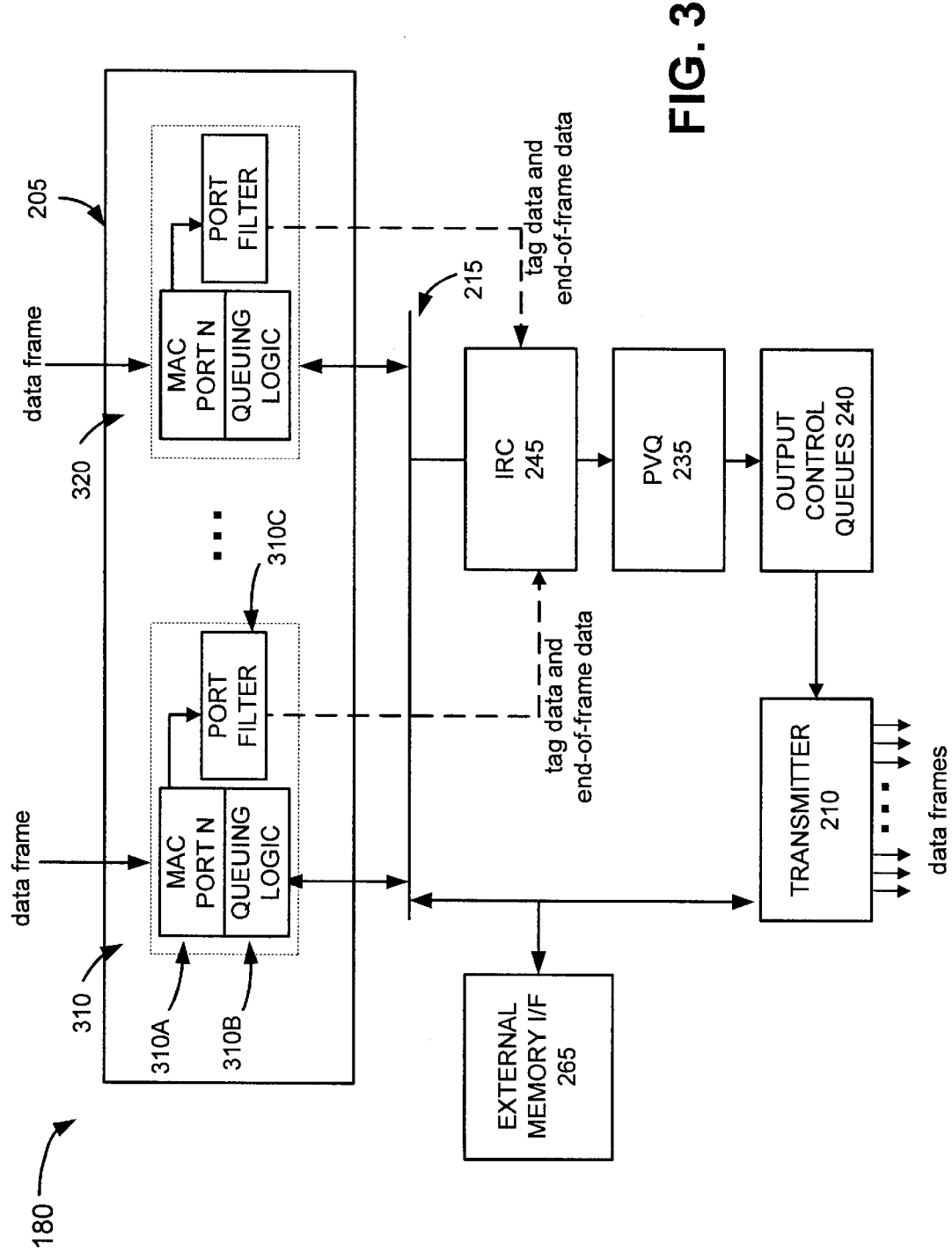
FIG. 3 is a detailed diagram of a portion of the multiport switch of FIG. 2 according to an implementation consistent with the present invention.

FIG. 3 is a detailed diagram of a portion of the multiport switch 180 according to an implementation consistent with the present invention. The portion of the multiport switch 180 shown in FIG. 3 includes the receiver 205, the data bus 215, the IRC 245, the PVQ 235, the external memory interface 265, the transmitter 210, and output control queues 240. The receiver 205 may include MAC modules 310 and 320 corresponding to input ports 1 through N, respectively. Each MAC module may include a receive port, queuing logic, and a port filter. For example, referring to FIG. 3, MAC module 310 may include a MAC receive port 310A, queuing logic 310B, and port filter 310C. The other MAC modules may similarly include a receive MAC port, queuing logic, and a port filter.

The MAC receive port 310A may include a FIFO that temporarily buffers data frames received on the corresponding input port. The queuing logic 310B may include logic responsible for transferring data frames from the MAC receive port 310A to the external memory 170 (FIG. 1) via the external memory interface 265. The port filter 310C may include logic for determining a priority associated with a received data frame. The port filter 310C may generate its priority results as "tag data" and "end-of-frame data" from the header information and send the results to the IRC 245. To this end, port filter 310C may receive the header information from each data frame received at the corresponding MAC receive port 310A. The tag data identifies the priority of the data frame and the end-of-frame data signals to the IRC 245 that the port filter 310C is finished with the data frame. Port filter 310C determines the tag data based on the contents of the data frame's header information. More particularly, port filter 310C may perform a pattern matching operation based on, for example, the VLAN information and IP port number from a data frame's header information.

In an exemplary implementation of the present invention, the port filter 310C categorizes data frames as having either a high priority or a low priority. A high priority data frame may include a data frame that requires lower access latency, such as a data frame destined for a management device or a data frame for a multimedia application. A low priority data frame may include any other data frame. In alternative implementations, the number of priorities associated with the data frame may be greater than two. For example, the multiport switch 180 may identify data frames having one of eight levels of priority.

In addition, in some implementations of the present invention, the multiport switch 180 may receive data frames having a priority indication. For example, an Ethernet data frame may include a three-bit field representing one of eight levels of priority. In this case, the port filter 310C on multiport switch 180 may map the received priority information to a corresponding priority level supported by the multiport switch 180. For example, the eight levels of priority may be mapped to either high or low priority on the multiport switch 180. Alternatively, the eight levels of priority associated with the received data frame may be mapped to three or more levels of priority on the multiport switch 180.

While port filter 310C is determining a data frame's priority information, IRC 245 also receives the data frame, transferred from queuing logic 310B over bus 215, and may proceed to identify the appropriate output ports for the data frame. To conserve bandwidth through IRC 245, only the data frame's header information may be transferred to the IRC 245, while the body of the data frame may be stored in external memory 170 through external memory interface 265. The IRC 245 may determine that a given data frame should be output by either a single port, multiple ports, all ports, or no ports. The IRC 245 may generate its results in the format <IRC Port Vector, IRC Frame Pointer>. The IRC port vector identifies the output port(s) for the data frame and the IRC frame pointer identifies the location of the data frame in memory, such as external memory 170. IRC 245 sends its port information to PVQ 235, but not until it receives the corresponding end-of-frame data from port filter 310C. At this time, IRC 245 sends the complete frame descriptor, including the frame's priority and output ports, to PVQ 235.

Figure 4:
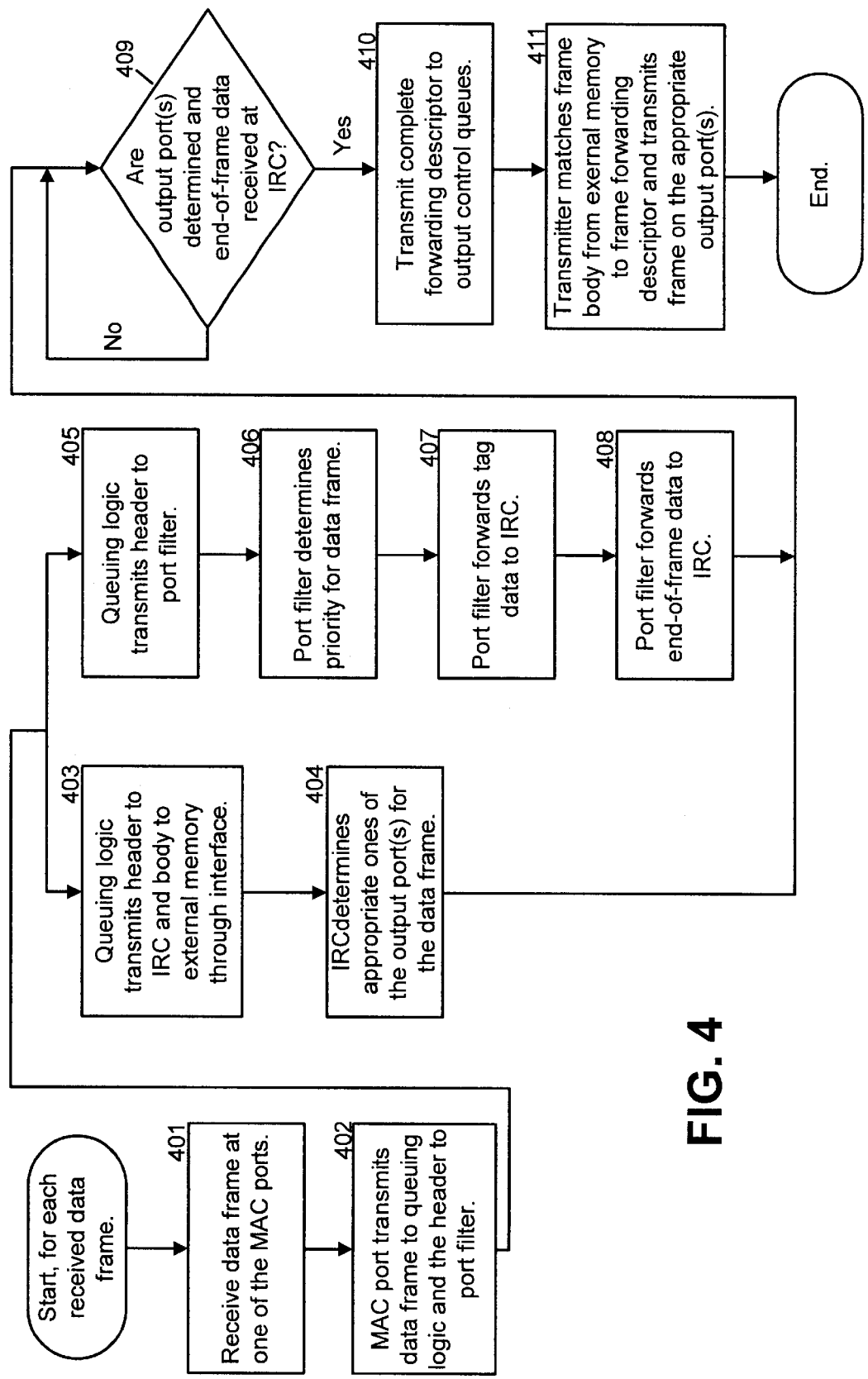
FIG. 4 is a flowchart of exemplary processing for a data frame received in the multiport switch of FIG. 2.

FIG. 4 is a flowchart illustrating exemplary processing for frame data received by the switch 180. To begin, each frame is initially received at one of MAC receive ports 310A. (Act 401). The MAC receive port 310A transmits the frame to queuing logic 310B and the frame header to port filter 310C. (Act 402). The queuing logic 310B transmits the frame header to IRC 245 and the frame body to external memory 170. (Act 403). Based on the header information, IRC 245 determines the correct output port(s) in switch 180 for the data frame. (Act 404). Independently of Acts 403 and 404, port filter 310C receives the frame's header information and, based on the header information, determines the frame's priority. (Acts 405 and 406). The port filter 310C transmits the priority information in the form of tag data to IRC 245. (Act 407). When the port filter 310C completes the priority determination for a frame, it transmits the end-of-frame data corresponding to the data frame to the IRC 245. (Act 408).

IRC 245, upon determining the output port information for the frame and receiving the end-of-frame data from port filter 310C, finishes generation of the forwarding descriptor for the frame. (Act 409). IRC 245 then forwards the complete forwarding descriptor, including the priority information and the output port information, to appropriate output control queues 240. (Act 410). The frame is then transmitted on the appropriate output ports of the switch 180. (Act 411).

As described above, frame forwarding information, such as frame priority information and frame output port information, are determined, in parallel, by the port filter and the IRC. The port filter sends an end-of-frame signal to the IRC when it has finished determining the priority information. When the IRC receives the end-of-frame signal and determines the frame output port(s), the IRC forwards the completed frame descriptor to the PVQ for eventual output of the frame data on the appropriate output ports. By performing the priority data lookup and output port lookup in parallel, the total delay time in the switch can be reduced.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts has been described with regard to FIG. 4, the order of the acts may differ in other implementations consistent with the present invention.

What is claimed is:

1. A multiport network device, comprising:

a receive port configured to receive data frames from a network, each of the data frames having header information that includes at least a source field indicating the source of the frame and a destination field indicating an intended destination for the data frame;

transmit ports configured to transmit the data frames to the network;

internal rules checking logic coupled to a first output of the receive port, the internal rules checking logic receiving the header information relating to the data frames received by the receive port and, based on the header information, generating a port vector that identifies the transmit ports for a particular one of the data frames, the internal rules checking logic forwarding at least the port vector and priority information of the data frame to the transmit ports when it receives an end-of-frame signal corresponding to the data frame; and a port filter coupled to a second output of the receive port, the port filter receiving the header information relating to the data frames received by the receive port and, based on the header information, determining the priority information for the data frame, the port filter transmitting the determined priority information to the internal rules checking logic and subsequently transmitting the end-of-frame signal to the internal rules checking logic.

2. The multiport network device of claim 1, wherein the port filter transmits the end-of-frame signal to the internal rules checking logic after the port filter has transmitted all of the priority information associated with the frame to the internal rules checking logic.

3. The multiport network device of claim 1, further comprising:

an external memory; and a bus connecting the external memory, the receive port, the internal rules checking logic, and the transmit ports, the receive port transmitting a body of the data frames to the external memory and transmitting the header information to the internal rules checking logic over the bus.

4. The multiport network device of claim 3, wherein the transmit ports match the body corresponding to each of the data frames to the forwarded port vector and priority information before transmitting the data frames in the network.

5. The multiport network device of claim 3, wherein the internal rules checking logic additionally forwards a frame pointer to the transmit ports, the frame pointer locating the body of the data frame in the external memory.

6. The multiport switch of claim 1, wherein the port filter determines the priority information for the data frame concurrently with the internal rules checking logic generating the port vector associated with the data frame.

7. The multiport network device of claim 1, wherein the multiport network device includes a plurality of receive ports configured to receive the data frames from the network.

8. The multiport network device of claim 1, further including:

a port vector queue connected to receive the priority information and the port vector from the internal rules checking logic; and output control queues connected to the port vector queue and the transmit ports.

9. A method for forwarding a data frame in a network device, the method comprising:

receiving the data frame at one of a plurality of receive ports in the network device, the data frame including header information that includes at least a source field indicating a source of the data frame and a destination field indicating an intended destination for the data frame;

determining, by internal rules checking logic, frame forwarding information for the data frame based on the header information, the frame forwarding information identifying transmit ports to output the data frame;

concurrently determining, by a port filter, priority information for the data frame based on the header information; and outputting, by the identified transmit ports, the data frame from the network device based on the determined priority information and the determined frame forwarding information.

10. The method of claim 9, further including transmitting the determined priority information by the port filter to the internal rules checking logic and subsequently transmitting an end-of-frame signal to the internal rules checking logic that indicates that all of the priority information for the data frame has been transmitted.

11. The method of claim 10, further comprising:

forwarding, by the internal rule checking logic, the frame forwarding information and the priority information for the data frame to the identified transmit ports after receiving the end-of-frame signal from the port filter.

12. The method of claim 10, further comprising transmitting a body of the data frame from the receive port to an external memory.

13. The method of claim 12, further comprising:

matching the body of the data frame from the external memory to the frame forwarding information and the priority data for the data frame when outputting the data frame from the network device.

14. A multiport network device for forwarding data frames in a network, comprising:

means for receiving data frames from the network, the data frames each having header information that includes at least a source field indicating the source of the frame and a destination field indicating an intended destination for the frame;

means for transmitting the received data frames to the network;

means for determining, based on the header information, a port vector that identifies the means for transmitting for a particular one of the data frames;

means for generating priority information for the data frames and transmitting the priority information to the means for generating, and generating an end-of-frame signal that indicates to the means for determining that the priority information for the data frane has been generated; and means for forwarding the end-of-frame signal to the means for determining after the priority information has been transmitted to the means for determining.

15. The multiport network device of claim 14, wherein the means for forwarding forwards the end-of-frame signal to the means for determining after the means for generating has transmitted all of the priority information associated with the frame to the means for determining.

16. The multiport switch of claim 14, wherein the means for generating generates the priority information for the data frame while the means for receiving determining determines the port vector associated with the data frame.

* * * * *